(12) United States Patent
Mercier et al.

(10) Patent No.: US 7,853,509 B2
(45) Date of Patent: Dec. 14, 2010

(54) LIFETIME INCOME

(75) Inventors: Jonathan L. Mercier, Manchester, CT (US); Ken A. McCullum, Simsbury, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 74 days.

(21) Appl. No.: 11/724,839

(22) Filed: Mar. 16, 2007

(65) Prior Publication Data

US 2008/0052210 A1 Feb. 28, 2008

Related U.S. Application Data

(60) Provisional application No. 60/785,141, filed on Mar. 23, 2006.

(51) Int. Cl.
*G06Q 40/00* (2006.01)

(52) U.S. Cl. .............. 705/36 R; 705/35; 705/36 T; 705/38

(58) Field of Classification Search .......... 705/35, 705/36 R, 36 T, 38
See application file for complete search history.

(56) References Cited

U.S. PATENT DOCUMENTS

| | | | |
|---|---|---|---|
| 6,275,807 B1 * | 8/2001 | Schirripa | .............. 705/36 R |
| 7,249,077 B2 | 7/2007 | Williams | |
| 7,376,608 B1 * | 5/2008 | Dellinger et al. | .......... 705/36 R |
| 2004/0177022 A1 | 9/2004 | Williams | |
| 2004/0267651 A1 * | 12/2004 | Jenson et al. | .............. 705/36 |
| 2005/0234821 A1 * | 10/2005 | Benham et al. | .............. 705/40 |
| 2005/0256748 A1 | 11/2005 | Gore et al. | |
| 2006/0085338 A1 * | 4/2006 | Stiff et al. | .............. 705/40 |
| 2006/0212380 A1 | 9/2006 | Williams | |

OTHER PUBLICATIONS

Anthony H Riccardi, & Thomas R Ireland. (2002). A Primer on Annuity Contracts, Structured Settlements, and Periodic-Payment Judgements. Journal of Legal Economics, 12(3), 1-46. Retrieved Jul. 15, 2010, from ABI/INFORM Global. (Document ID: 805466031).*
Sally Law. (Mar. 2006). Is It Better To Give Than To Receive? USBanker, 116(3), 49. Retrieved Jul. 15, 2010, from ABI/INFORM Global. (Document ID: 1001244281).*
Long, B.. (Jan. 2004). Solving The Other Half Of the Retirement Equation. Life Insurance Selling: Review & Outlook 2004,30,32,34-35. Retrieved Jul. 15, 2010, from Banking Information Source. (Document ID: 1480935461).*
International Search Report dated Nov. 6, 2007 issued in related Application No. PCT/US07/07006.

* cited by examiner

*Primary Examiner*—Alexander Kalinowski
*Assistant Examiner*—Muriel Tinkler
(74) *Attorney, Agent, or Firm*—Howard IP Law Group, PC

(57) ABSTRACT

The present invention provides an investment option known as a lifetime income share. Lifetime income shares mitigate survival risk, the risk that an individual will outlive his or her assets. More specifically, the purchase of a plurality of lifetime income shares guarantees an individual a predetermined, periodic income payment for the life of the purchaser. The guaranteed stream of monthly income commences at a specified age. Furthermore, the guaranteed stream is utilized to supplement an existing income level or provide income in the event that the individual outlives his or her accumulated liquid assets.

73 Claims, 11 Drawing Sheets

LIFETIME INCOME

CROSS-REFERENCE TO RELATED APPLICATION

This application claims priority to U.S. Provisional Application Ser. No. 60/785,141, filed Mar. 23, 2006, the entire contents of which is herein incorporated by reference.

FIELD OF THE INVENTION

The present invention generally relates to the field of insurance. More specifically, the present invention discloses a novel deferred annuity investment option which guarantees an individual a predetermined income starting at a specified time in the future. The annuity, or plan known as a "lifetime income share," provides a fixed income to a purchaser beginning at a predetermined period of time and continuing throughout the purchaser's life, thereby mitigating survival risk.

BACKGROUND OF THE INVENTION

One of the distinguishing characteristics of human beings from other species is their ability to think and plan ahead. Nevertheless, many people have great trouble preparing for long term future events such as retirement.

Thinking and acting on thoughts in advance are keys to preparing for the future when it turns inexorably into the present. The younger a person is, the more time he or she has to plan for retirement. In addition, earlier planning and investing provides an individual with more flexibility and a greater probability of an increased "nest egg" because many investments provide compound returns over time.

Most individuals work at least 40 years with the goal of retiring at 65. After retiring, a typical individual utilizes a predetermined percentage of his or her accumulated assets each year to maintain the lifestyle to which he or she is accustomed. Generally, the individual no longer works to increase the sum total of assets. Thus, the individual's income sources are limited to investments and government support, if applicable. In addition, the average life expectancy for a male reaching age 65 is currently approximately 85, and has increased significantly over the last 10 years. As a result of all of those factors, there is a substantial risk that an individual may expend the sum total of his or her accumulated assets before passing away, leaving the individual without independent financial support. This "survival risk" can greatly complicate the financial planning process for individuals approaching retirement. The purchase of lifetime retirement income can assist in the management of survival risk. The invention described below, inter alia, significantly simplifies the process of purchasing retirement income over time.

Accordingly, retirement planning consists of more than picking an age to retire and a beachfront property on which to retire. In stark contrast, retirement planning requires analysis of an individual's lifestyle, resources, and a myriad of other factors that are often taken for granted while an individual is working. Most of these factors relate to financial issues.

A particularly valuable tool used in retirement planning is the use of retirement plans. Many mid-size and large employers offer various retirement plans to their employees. Indeed, many have two or more. There are several types of retirement plans.

With respect to one such retirement plan, a "defined benefit plan" or a "company pension," employers typically fund a pension account with or without any financial contributions from the employees. An employee's final retirement income benefit (i.e., periodic income payment received for life upon retiring) is determined by a formula often based on years of service, an average wage, and a percent of pay.

For example, the plan could set a final benefit of a "joint and 50% annuity calculated as 1.5% times years of credited service times the average of an individual's last three years' base annual wage." With 30 years of service, at retirement a pension can replace roughly 45% of an individual's final annual wage. Under the typical defined benefits plan, the survival risk, as well as all investment risk, is assumed by the employer. Generally, this risk is substantially mitigated by pooling it over a large number of retirees.

Defined benefit plans have developed several optional policies and tools to fund the employer's obligation. One such early tool, first used over 50 years ago, is known as a group deferred income annuity. An employer purchasing a group deferred income annuity contract makes periodic payments to an insurance company, which applies these payments to the purchase of deferred annuities for covered workers. The purchase price is specified by the employer's contract with the insurance company. As a result, the insurer indemnifies the employer against changes in rates of return, mortality risk, or other factors that could alter the funding costs of the defined benefit plan. In short, the group deferred income annuity transfers the survival risk and the investment loss from the employer to the insurance company.

Over the years, employers have moved to other approaches to funding their defined benefit plans. These approaches emphasized flexibility over guarantees. In particular, these approaches allowed employers to defer funding their pension obligations, leading to a significant number of under funded defined benefit plans. This, along with other factors, caused defined benefit plans to lose favor among employers.

Increasingly, defined benefit plans are no longer being provided by many employers. This is part of a long-term trend, which virtually all experts agree will continue, and may even accelerate. As a result, defined benefit plans are either unavailable, or, when available, do not provide income levels that adequately alleviate an individual's survival risk or the mortality risk associated with a group, such as the employees of an employer.

Notwithstanding the disfavor among employers, defined benefit plans in general, and group deferred income annuities in particular, continue to have substantial benefits to individual employees. This is because they assure a constant stream of lifetime income, which allows an individual to better plan for their future income requirements in retirement.

Another type of retirement plan typically offered by employers, a "defined contribution plan," provides an individual account for each participant. The benefits (i.e., the amount available to the employee in retirement) are based on the amount of funds contributed to the individual's account and are affected by such factors as income, expenses, gains, and losses. Some examples of defined contribution plans include 401(k) plans, 403(b) plans, 457 plans, employee stock ownership plans, and profit sharing plans.

Often, an employer will make contributions to an employee's account in addition to an individual's contribution. While these contributions vary by employer, employers typically match an individual's contribution from 50% to 100% up to 6% of an individual's pay. In short, if an individual contributes 6% of his or her paycheck to the retirement account, an employer contributes between 3% and 6% as well. Although defined contribution plans have certain advantages, they place virtually all of the survival risk and all of the investment risk on the employee. The typical defined contribution plan does not provide an efficient means of purchasing a dependable lifetime income stream or converting the accumulated assets into such a dependable stream. As a result, defined contribution plans are largely ineffective as a vehicle for permitting participating individuals to reduce the survival risk inherent in a person's retirement.

Current defined contribution retirement plans have limited or no success in incorporating the benefits to individual employees associated with a defined benefit plan. In particular, the benefit of a known, guaranteed lifetime retirement income is generally not available under any defined contribution plans. Accordingly, there is a clear need in the art for an investment facility that efficiently combines the benefits and flexibility of a defined contribution plan and the security of a guaranteed monthly retirement income. The present invention, inter alia, adapts the high level of retirement income security provided by a group deferred annuity to the complexities of modern defined contribution plan recordkeeping, with their multiple complex investment choices.

While most individuals have access to defined contribution plans, not all do. Furthermore, not all defined contribution plans can be expected to offer lifetime income shares. In many situations, individuals will need to use tax qualified Individual Retirement Accounts ("IRAs"), tax qualified individual retirement annuities or personal savings to plan for their retirement. Thus the invention, lifetime income shares, will also be made available, in an individual or group policy version, that can be purchased separately or as an investment vehicle on the recordkeeping platform of a particular IRA provider.

Because current retirement plans and programs typically do not provide participants with effective tools to mitigate their individual survival risk, there is a clear need in the art for a system and method to more effectively manage the risk associated with outliving one's accumulated assets. The present invention overcomes the various deficiencies associated with traditional survival risk management techniques by creating a novel system and method that allows an individual employee to elect an "investment option" in a defined contribution plan or through an IRA provider that is known as a "lifetime income share." Rather than having an investment account balance, the employee accumulates shares that guarantee him a precise amount of monthly lifetime retirement income, guaranteed for life, starting at age 65.

SUMMARY OF THE INVENTION

The present invention comprises a fixed deferred annuity that provides a guaranteed lifetime monthly income within the context of a defined contribution plan or similar investment savings program, using the vehicle of a lifetime income share. The lifetime income share allows a participant or other individual to receive the survival risk management and dollar cost averaging benefits associated with a guaranteed retirement income annuity in the context of a defined contribution plan or similar record keeping platform, such as that of an IRA provider.

The lifetime income shares can be offered as an option in an employer sponsored defined contribution plan (qualified or non-qualified) or as a stand alone investment feature, through an IRA or similar tax qualified or non-tax qualified investment savings vehicle. Lifetime income shares are designed to be readily integrated into a defined contribution plan, and allow easy access of information between the insurance company, the plan record keeper, the employer and the purchasing annuitant.

The lifetime income share could also be used to fund some or all of an employer's obligation under a "cash balance plan (which combines the features of defined benefit and defined contribution plans) or under a traditional qualified or non-qualified defined benefit plan.

Unlike both traditional individual deferred annuities and typical defined contribution plans, the lifetime income share preferably has no account balance. Advantageously, it provides an easy and effective means for an individual to purchase a guaranteed lifetime retirement income in frequent, small purchases, typically via payroll deduction through his or her employer's defined contribution plan or similar recordkeeping platform. Fractional share units may be purchased, which, in turn, may represent fractional "cents" of monthly lifetime income. Accordingly, there is no practical limit on how small an individual purchase may be.

Frequent purchases over an extended period of time also help mitigate the investment risk implicit in the purchase of a single premium annuity at retirement. If available interest rates are abnormally low at retirement, when such a purchase is made, the resultant periodic retirement income amount will be substantially reduced. By spreading purchases over an extended period of years, the risk associated with abnormally low investment earnings rates at point of purchase is substantially mitigated.

The present invention also comprises a method of offering a lifetime income share. The method preferably comprises determining multiple age (and gender) based lifetime income share prices, communicating these prices on a daily (or less frequent) basis to the plan or other providers' record keeping system(s), and applying the lifetime income share prices to purchase the appropriate number of shares for each contributing participant, based on that participant's age and, in some cases, gender. Each share preferably utilizes a standardized annuity payment form, with a uniform age-based income start date. Participants can preferably elect alternative annuity payment forms or income start dates only at the time they choose to start receiving periodic retirement income payments. Any death benefit prior to income start date, including, in some iterations a spousal or survival annuity, is also standardized.

Lifetime income shares are preferably offered to plan participants through each of the communications media used by the plan's record keeper (e.g., print, phone, Internet, etc.). A participant can preferably elect to purchase lifetime income shares through periodic-plan contributions or through a transfer of funds from another plan investment option. All transactions are preferably processed automatically through the plan's record keeping system by applying the appropriate age-based share price to the available funds.

On the income start date, the offeror begins to disburse lifetime income payments as dictated by the terms of each share. The amount is adjusted to reflect the actual start date by applying an actuarial adjustment factor. That factor is calculated using a principal based methodology, based on current pricing methods and assumptions, rather than by using a static factor table. Payments continue for the life of the applicant.

Further, as of the income start date or similar non-selectable dates (e.g., the death of the annuitant) the income payments can be made payable on the life of another individual (e.g., a spouse or other named natural person beneficiary). It also can be made payable on multiple lives (e.g., a joint and survivor annuity).

Further, it can incorporate any form of death benefit normally utilized currently in connection with single premium annuity purchases (e.g., period certain; cash refund; etc.).

In light of the foregoing, it is an object of the present invention to provide participants/annuitants with a useful means to mitigate their personal survival risk.

Further, it is an object of the present invention to provide a financial retirement planning tool(s) that permit an individual to currently mitigate their survival risk through advance planning. Such tools will, among other things:

Allow a participant to determine the dollar amount he needs to apply, using current age based share prices, to meet specified lifetime retirement income goals;

Allow a participant to determine the lump sum amount needed, using current age based share prices, to purchase a specified supplemental amount of retirement income;

Allow a participant to determine the plan contribution rate needed, using current age based share prices, to meet specified lifetime retirement income goals; and Adjust the above calculations to reflect other additional assumptions, such as anticipated rate of salary or wage rate increases.

Provide a basis for a reasonable comparison of an investment in income shares to comparable investment options (i.e., long term bond funds, stable value funds, etc.)

Yet another object of the present invention is to provide an annuity which reduces the risks associated with survival.

Still another object of the present invention is to provide a method whereby an individual reduces his or her risks associated with survival.

It is also an object of the present invention to provide for the purchase of periodic income benefits over time through payroll deduction and/or inter-fund transfers.

Another object of the present invention is to provide for multiple payout options, including single life and joint and survivor.

Still another object of the present invention is to offer a death benefit that allows the lifetime income guarantee to be optimally transferred to another measuring life, such as a spouse or other natural person.

Still another object of the present invention is to offer a full range of traditional annuity death benefits, such as a full cash refund payout option.

Still yet another object of the present invention is to provide a fixed deferred payout annuity that provides guaranteed lifetime income.

Other objects, features, and characteristics of the present invention, as well as the methods of operation and functions of the related elements of the structure, and the combination of parts and economies of manufacture, will become more apparent upon consideration of the following detailed description with reference to the accompanying drawings, all of which form a part of this specification.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

Figure 1:
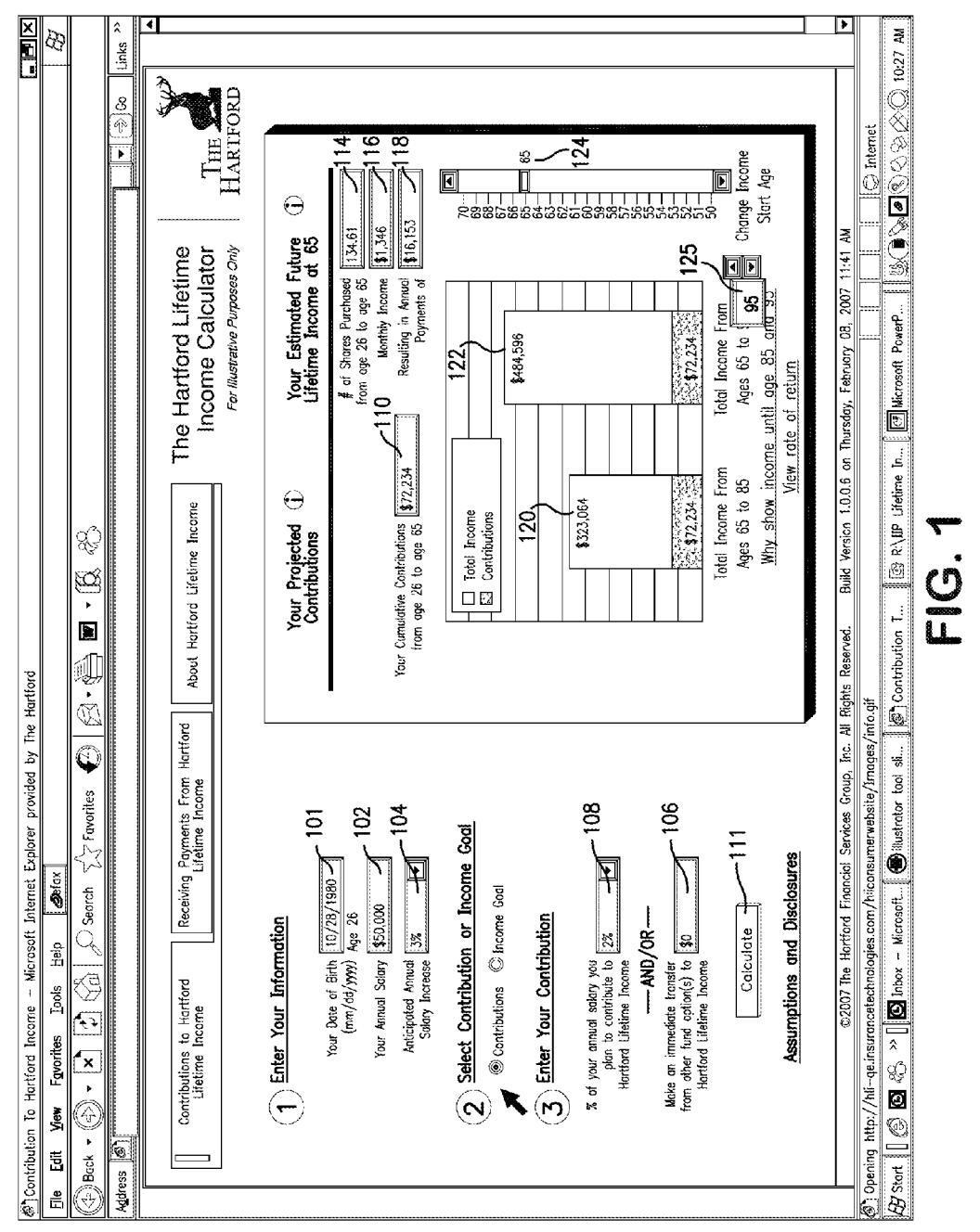
Figure 2:
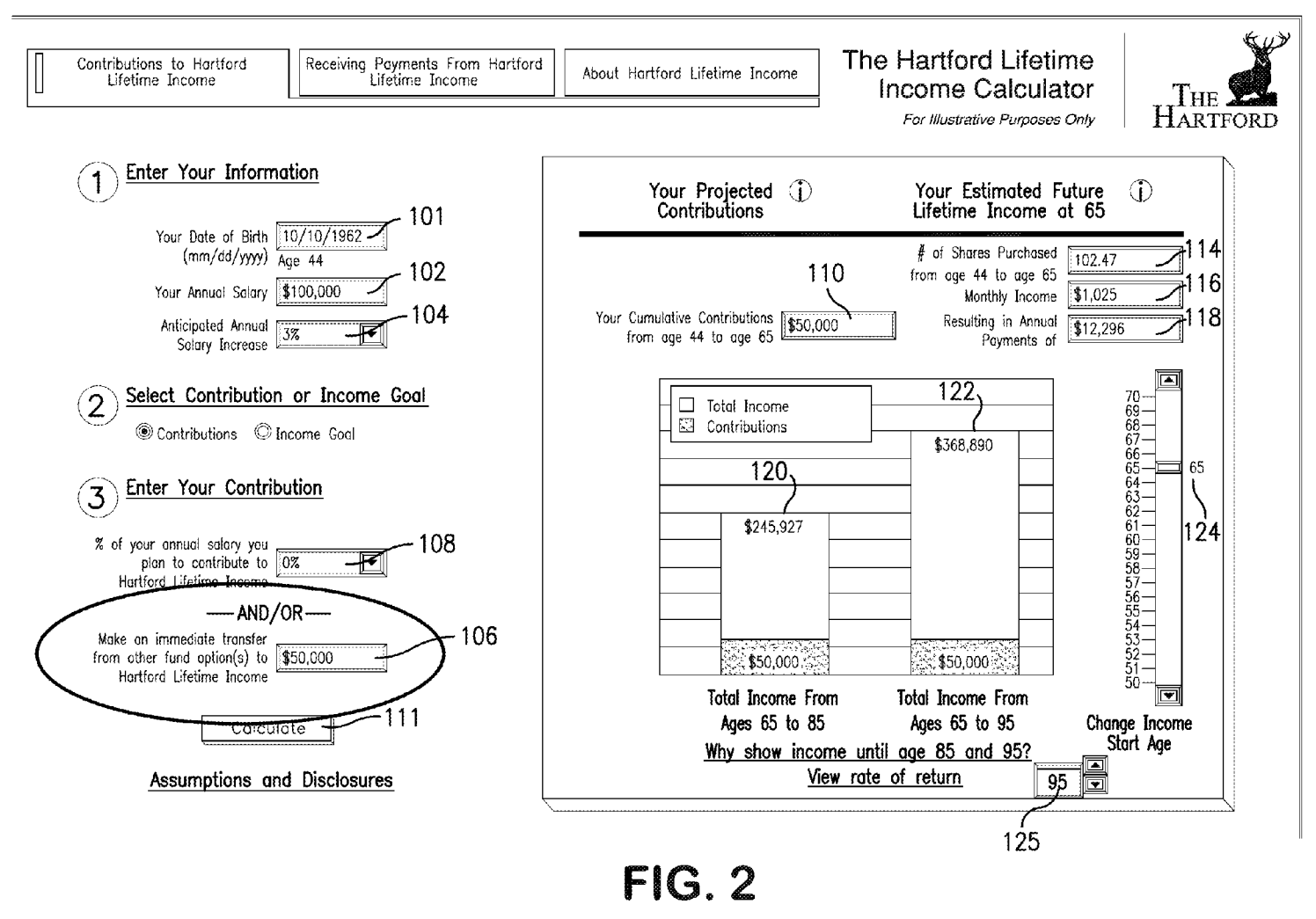
Figure 3:
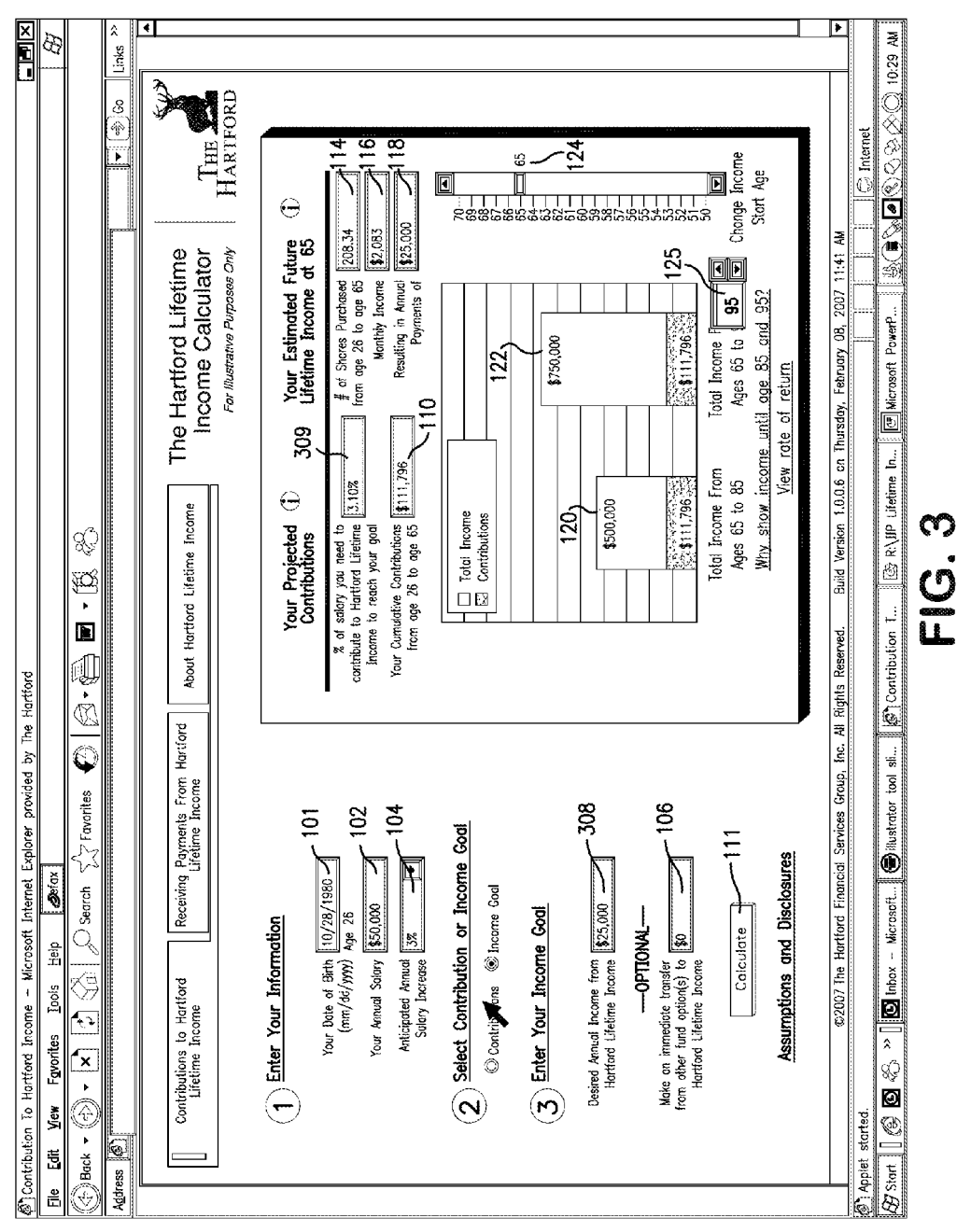

FIGS. 1-5 are screen shots depicting the process of estimating future lifetime income in accordance with the preferred embodiment of the present invention.

FIGS. 7-8 are screen shots depicting the process of determining an individual's future lifetime income in accordance with the preferred embodiment of the present invention.

DETAILED DESCRIPTION OF THE PREFERRED EMBODIMENT

Figure 5:
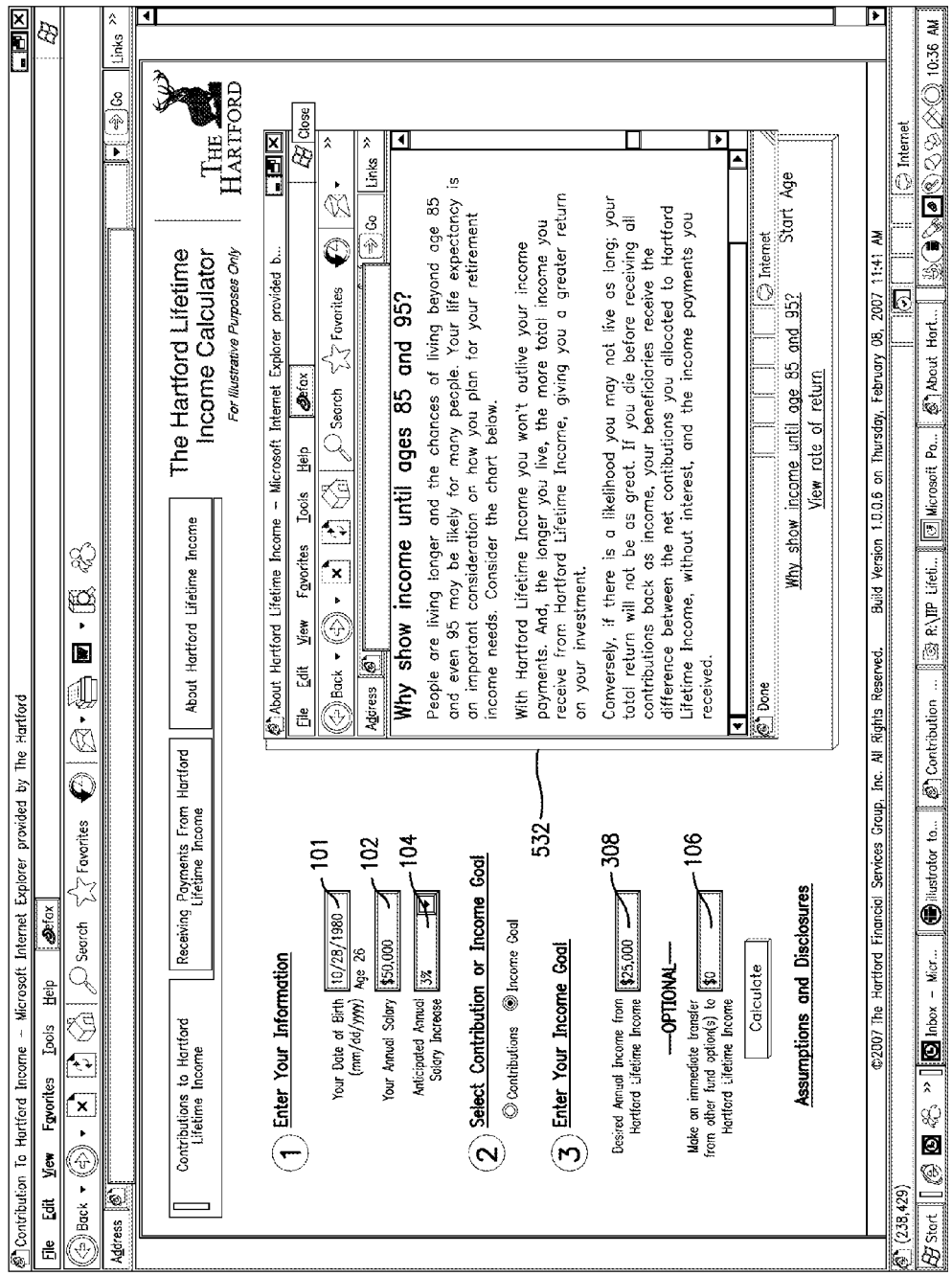
Figure 6:
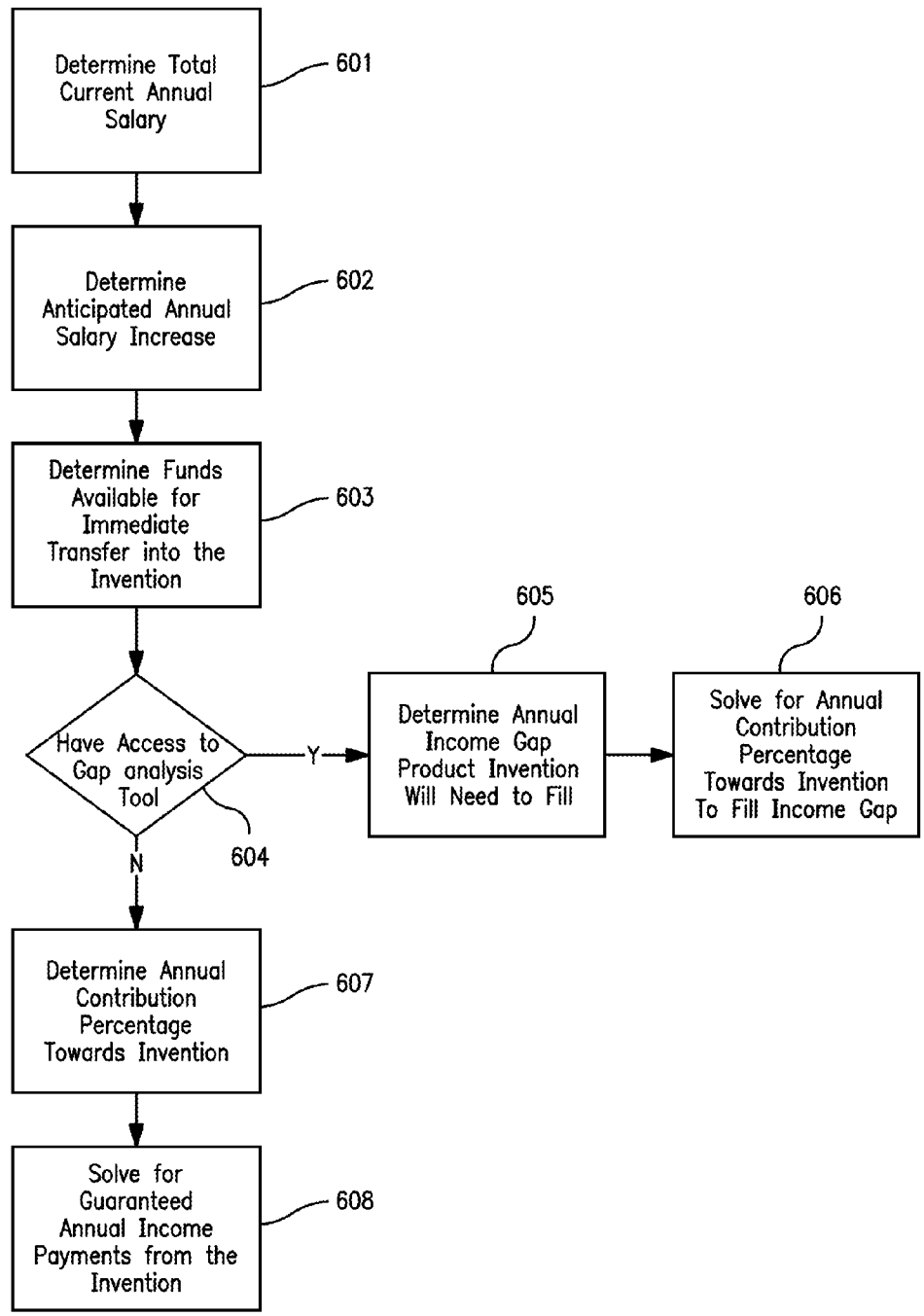
FIG. 6 is a flow chart depicting the process of estimating future lifetime income in accordance with the preferred embodiment of the present invention.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment of the present invention.

Description of Income Shares Functionality

The preferred embodiment of the present invention allows for the single, infrequent or frequent and potentially very small purchases of future guaranteed income increments, by a single or large number of individuals, through a vehicle or plan (e.g., a financial institution's defined contribution plan or IRA recordkeeping system) designed to track more traditional, accumulation focused investment products.

Numerous accommodations are preferably made to accommodate the unique characteristics of lifetime income shares. These include, but are not limited to:

Maintaining separate price files for each age gradation, with the possibility of separate prices for each gender;

Maintaining multiple values for distinct transaction types (e.g., death benefit, surrender or transfer benefit, income amount, etc.);

Provide income planning tools designed to estimate the impact of current or continuing share purchase levels on the level of guaranteed lifetime retirement income an individual can be assured of receiving;

Providing for adjusted benefit quotation and election capabilities over a wide range of ages and benefit types;

A process for allowing the income share provider to assume certain plan compliance functionality associated with plan provided lifetime benefits;

Establishing and maintaining adequate insurance regulatory reserves;

A process for determining, verifying and reconciling participant age data;

A process for complying with regulatory and reporting requirements applicable to both the income share provider and the plan; and Meeting the specific distribution needs of participating plans and programs (e.g. Forfeitures and corrective distributions).

In addition, the present invention has the inherent flexibility to adapt to the unique characteristics of existing requirements of the various organizations that provide recordkeeping services to employer defined contribution plans or to various financial institutions and service partners that provide such services or offer IRA products.

To accomplish this result, each purchase preferably is made through a uniform "Lifetime Income Share". A "share" or plan is defined as a unit of periodic income on a single life starting at a specific age or date. The shares may be purchased through periodic contributions, aperiodic contributions, or a lump-sum contribution. The income may also be aperiodic or a lump sum, although, in the preferred embodiment, the income is periodic. For example, in the preferred embodiment, a share is defined as equaling $10 of monthly lifetime retirement income starting when the purchaser reaches age 65 (or another defined age). A critical concept is that all purchases for a defined group are preferably made on the identical basis, thereby facilitating the large number of potential transactions contemplated by the invention. Of course, a lifetime income share can be designed such that the retirement income can be any amount. Further, the start age of the annuity or other payments can be altered to any age as is known in the art.

The use of a single unique share definition for purchases does not result in a need to impose any limiting requirements that the income be actually received in accordance with the definition. The participant or annuitant continues to have substantial flexibility as to when and in what form income is actually taken.

This is preferably accomplished through the use of a discrete set of actuarial adjustment factors developed using a principal based methodology, where the actuarial adjustment factors are calculated based on current pricing methods and assumptions, rather than by using a static factor table. These factors may be available to the record keeper and/or participant or annuitant through an automated illustration tool and can be applied at or before the point an individual participant or annuitant chooses to receive periodic income. These factors may also be available through a separate or integrated quoting tool intended to provide an actionable benefit quotation at the point the participant or annuitant is electing to receive income. These tools are able to determine the income value of each share, as adjusted to primarily reflect some or all of the following effects:

Taking income at a younger age than the age specified in the share definition;

Taking income at an older age than the age specified in the share definition;

Taking income in a benefit form (e.g., an annuity on two lives) other than that specified in the share definition;

Taking income in a benefit form with a death benefit other than that specified in the share definition;

Age verification procedures, through the use of publicly available electronic databases (e.g., Social Security data files);

Taking income at a frequency (e.g., quarterly) other than that specified in the share definition;

Future increases in periodic income amounts, intended to off-set the impact of inflation on real retirement income; and Making any other adjustment typically made in conjunction with commercial immediate income annuities.

The price of a lifetime income share may vary as frequently as daily, or less frequent pricing (e.g., weekly) may be used. The price of a lifetime income share preferably varies with the age of a participant. It may also vary with other factors, including, for example, a participant's gender. Typically, there will be a separate and distinct price for each age at which shares can be purchased (e.g., 20 years old to 70 years old). The age used may be based on one or more of the traditional bases common in the insurance industry (e.g., age of last birthday). However, in the preferred embodiment of the invention age is determined on a calendar year basis (e.g., age on January 1 of each year). Advantageously, this allows adjustments to all ages of all participants or annuitants to be made once per year, on a single date, thus greatly simplifying the recordkeeping process for an age sensitive product. For example, a Committee on Uniform Security Identification Procedures-like ("CUSIP-like") number or similar generic alpha and/or numeric designator could be assigned to a single share class for all individuals of the same gender born in a single calendar year. All shares purchased by that class of individuals would always have the same number.

Premium payments (i.e., the price of a share) can be paid in a single sum. Alternatively, premium payments can be paid in periodic installments (e.g., bi-weekly monthly, etc); to match the pay and plan contribution cycle of the employer sponsoring a defined contribution plan or to reflect automated withdrawals from an individual's bank or investment account. One of ordinary skill in the art will readily appreciated that flexible premium payments may also be utilized.

Advantageously, the premium required to purchase future income can be very small because of the efficiencies of utilizing the capabilities of the existing plan record keeping system. Investment returns during the potentially long deferral period allow the provider of the present invention to provide a higher income benefit at the income start date. These income benefits may be further enhanced by mortality gains that the surviving individuals enjoy. This aspect of the invention may be enhanced by the imposition of limits on share liquidity, including, but not limited to, the impositions of a prudent mortality/investment risk anti-selection charge or, even, the absence of any liquidity.

Several additional features are preferably included in the preferred embodiment of the invention, especially when used in conjunction with an employer's defined contribution plan. These features are designed to fully incorporate the offering of lifetime income shares into the daily operations of the defined contribution plan on similar system.

The price base for current purchases of lifetime income shares is expressed in a manner that permits comparison to other available investment choices (e.g., "Price implies the return of 10 year Treasury Security, plus 65 basis points assuming death at age 85"). This basis could be tailored to reflect the pricing for specific age or specific age groups.

The periodic statements provided to individuals preferably reflect the actual periodic shares purchased both for the actual statement period and the total monthly income purchased to date and the amount of periodic income they reflect. Advantageously, this distinguishes the unique characteristics of lifetime income shares as compared to the other investment choices available under the plan or program.

Lifetime income shares may have reduced or limited liquidity, as compared to the very high liquidity level afforded by comparable investments available through employer defined contribution plans and similar programs. As described earlier, this feature can provide a significantly enhanced investment return and additional investment diversification benefits to the individual participants. These benefits are generally not available through most traditional investments available through defined contribution plans or IRAs.

Where liquidity is provided, a uniform bid/asked spread is preferably imposed. By compensating the lifetime income share provider for mortality and other anti-selection risks, it helps control the share price, thus maximizing the income that can be purchased and improving the competitive value of the invention in the marketplace.

The liquidity amount is preferably determined by a reverse purchase transaction. That is, the amount paid for redeemed shares is the amount the lifetime income share provider would have charged that individual to purchase identical shares, less any investment risk and/or mortality anti-selection spread. By using this approach, the present invention avoids the need to maintain any account balance. Furthermore, this also simplifies maintenance and avoids the need for any explicit guaranteed investment rates, or market value adjustment formulas or similar features, commonly associated with other guaranteed annuity products.

In the preferred embodiment of the present invention, individuals may be absolutely guaranteed that they or their heirs will always receive the full amount actually used to purchase lifetime income shares, less any amounts received by the participant/annuitant.

Description of Recordkeeping Models

Initially, a potential provider of lifetime income shares (i.e., a financial institution or plan record-keeper) may decide to provide lifetime income shares to the employer plans or other customers using either of two basic models of the present invention: the "Insurer Calculate" transaction model and the "Recordkeeper Calculate" transaction model.

Under both models, a participant/annuitant is preferably provided with the opportunity to purchase a lifetime income share as part of a portfolio of investment options in a defined contribution plan, such as a 401(k) plan. For example, a participant's employer can introduce a retirement plan with this feature. Alternatively, the benefits provider of an existing retirement plan can add this feature to an existing plan. One of ordinary skill in the art will readily appreciate that any other provider or entity can provide information related to lifetime income shares. Information sources include the internet, direct advertising brochures, other marketing materials, or any other means of making information available to a potential participant.

In the preferred embodiment of the present invention, a participant can access information related to lifetime income shares via an online platform as shown in FIGS. 1-5. For example, a participant can access a lifetime income share calculator as shown in FIGS. 1-5.

Referring to FIGS. 1-6, shown is the method for using the share calculator. In step 601 of FIG. 6, after entering their date of birth into field 101 of FIGS. 1-5 to determine the participant's age, an participant would need to determine the total current annual salary the participant is receiving. This information is then input into field 102 of FIGS. 1-5. Then, in step 602, an participant would enter their average anticipated annual salary increase they expect to receive over the period they plan to invest prior to retirement. This information is then input into field 104 of FIGS. 1-5. Then, in step 603, an participant would enter the amount of funds the participant believes they will immediately transfer. This information is then input into field 106 of FIGS. 1-5.

The user then presses the calculate button 111 and the total contributions are shown in field 110. The monthly income is shown in field 116 and the annual income is shown in field 118. The number of shares purchased is shown in field 114. A graph showing the total income and contributions from ages 65-85 is shown at 120, and a graph showing the total income and contributions from ages 65-95 is shown at 122. The participant can use the drop down 125 to increase or decrease life expectancy. The participant also would indicate the age that the participant wishes the income to start using the slider 124.

Then, in step 604, it is determined whether the participant has access to a gap analysis tool. If the participant does have access to a gap analysis tool, then in step 605, it is determined the annual income gap product that will need to be filled. The gap determined is then input into field 308 of FIG. 3. Then, in step 606, the annual percentage that the participant would need to contribute is determined to fill a specific retirement income gap at a specific retirement age is shown in field 309.

Figure 4:
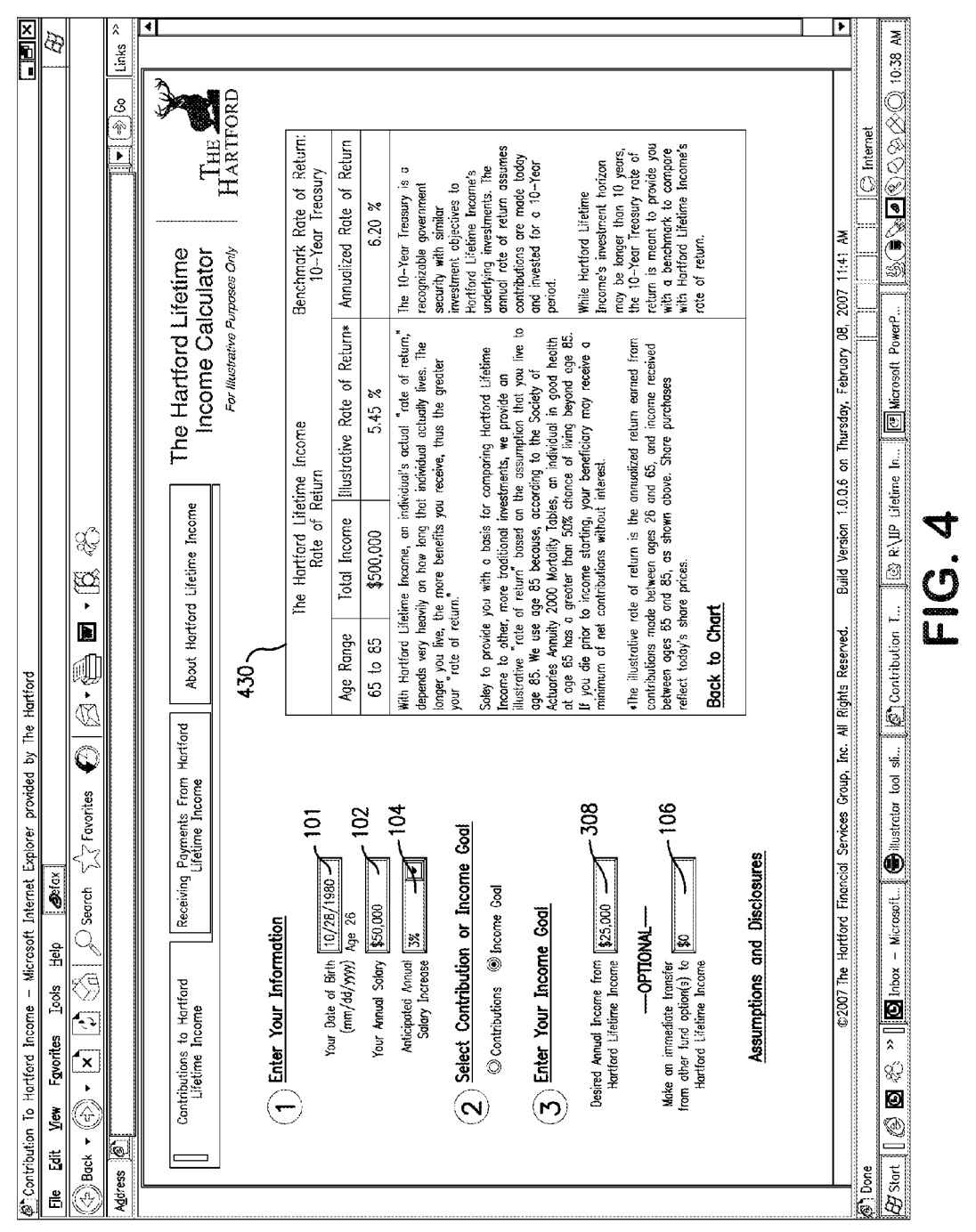

In field 430, FIG. 4, there is shown an explanation of the "rate of return". In field 532, FIG. 5, there is shown a description of why the incomes are shown until ages 85 and 95.

If, in step 604, it is determined that the participant does not have access to a gap analysis tool, then in step 607, the total annual income the participant would receive at a specific retirement age is determined based on a annual contribution. This contribution is input as a percentage in field 108. Output is based on the assumption that future share prices are the same as current prices.

Therefore, after entering variables such as age and hypothetical contribution amount, the lifetime income share calculator preferably displays the number of share(s) and the age benefit payout purchased by the hypothetical contribution to the potential participant.

Figure 7:
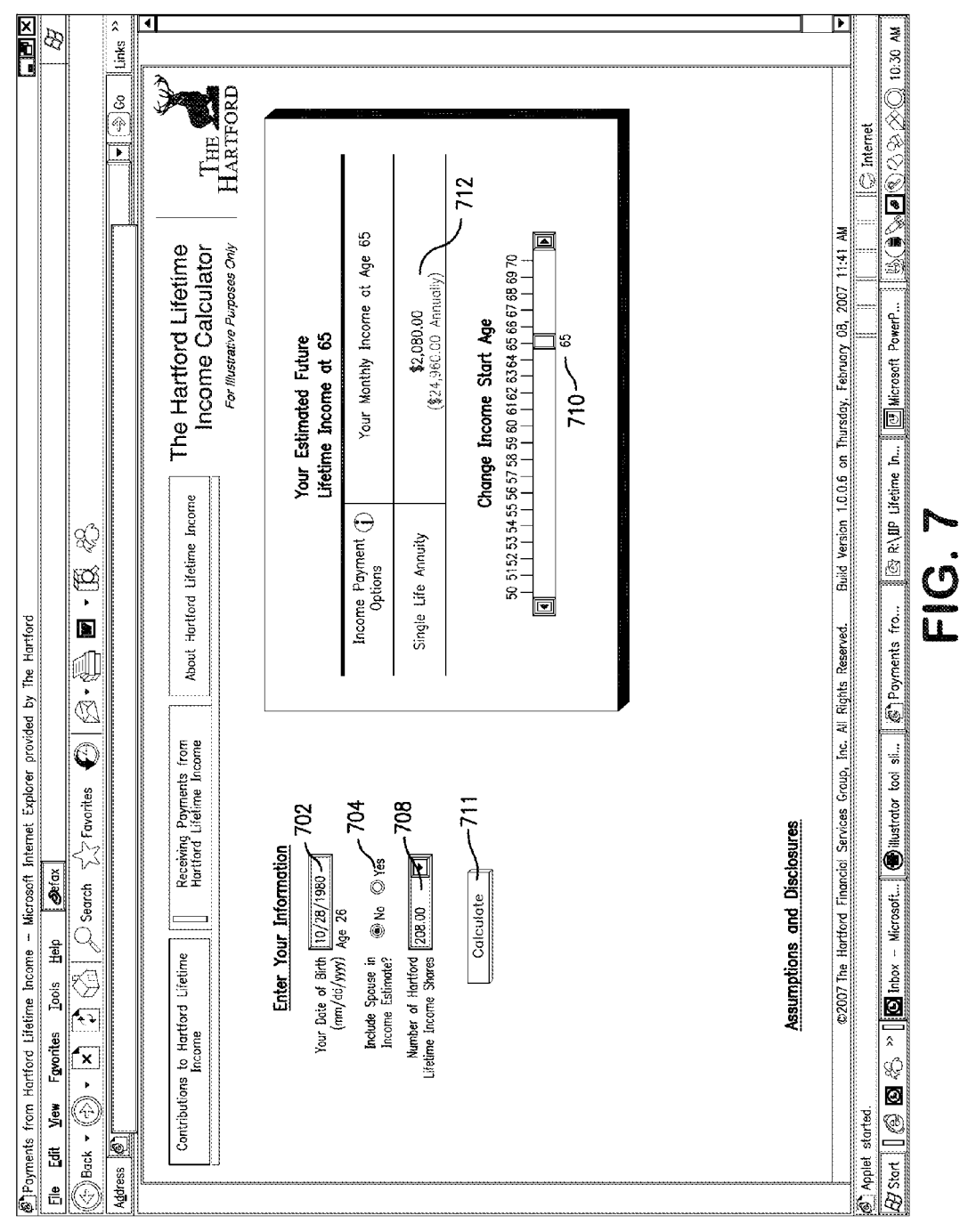
Figure 8:
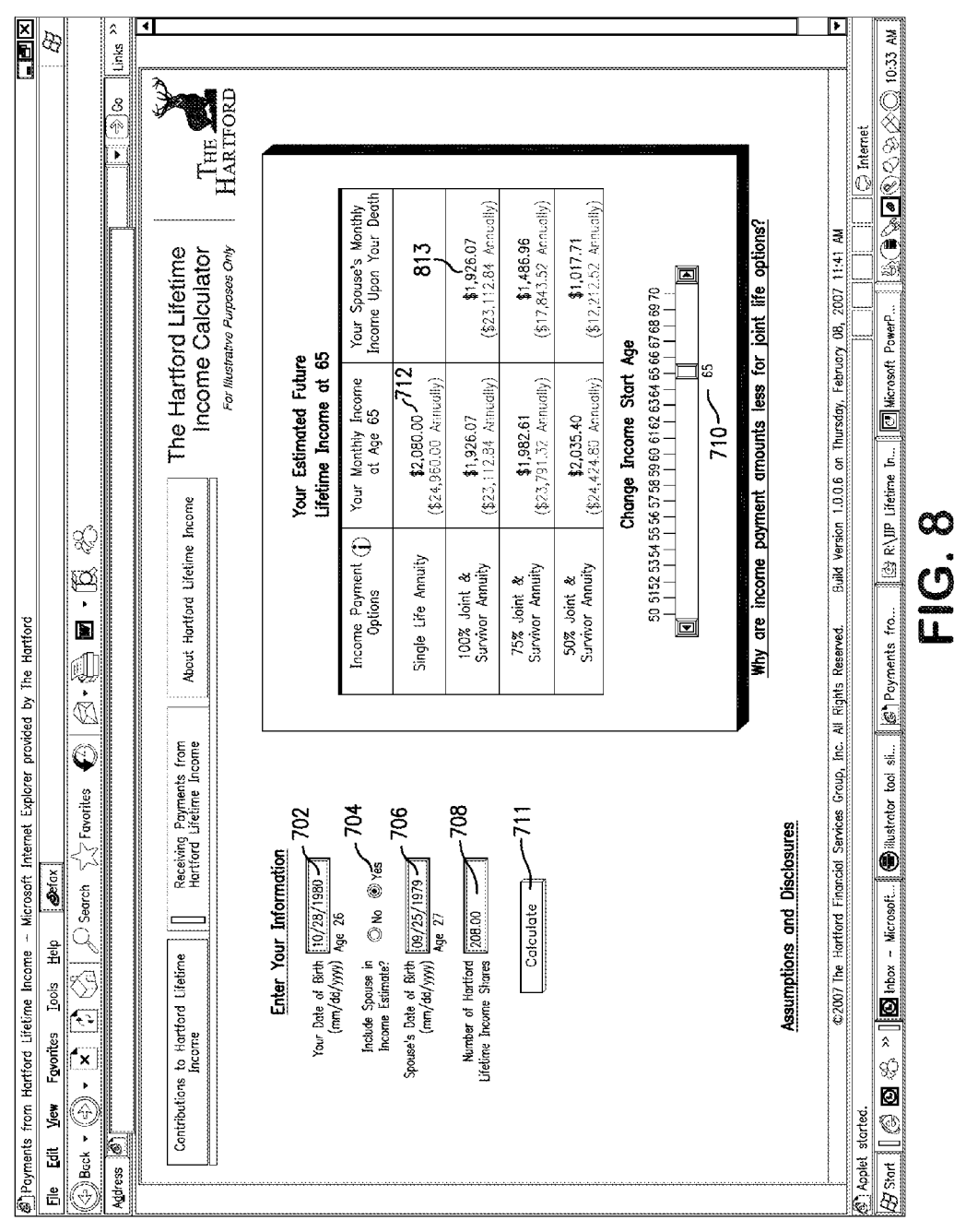

As shown by FIGS. 7 and 8, the lifetime income share calculator may also be used to determine an participant's estimated future lifetime income. The participant would put in the participant's date of birth in field 702 of FIGS. 7 and 8. Then, the participant would indicate in field 704 whether the participant's spouse was to be included in the income estimate. If a spouse is to be included, the spouse's date of birth would be entered into field 706. Then, the number of shares the participant owns would be entered in field 708. The user then presses the calculate button 711 and the monthly and annual income is shown in field 712, including different income payment options. If a spouse was included in the income estimate, then the spouse's monthly and annual income upon the participant's death is shown in field 813 of FIG. 8. The participant would indicate the age that the participant wishes the income to start using the slider 710.

This illustration technology allows each participant to solve for his or her retirement objectives in the manner most meaningful for the purchaser (e.g., solve for how many lifetime income shares could be bought or, alternatively, determining how much money needs to be invested today to meet the participant's retirement income target).

As the illustration is based on actual current share purchase rates, it is also fully actionable. A participant or annuitant can, in many cases, effect an immediate transfer to purchase some or all of the lifetime retirement income the participant deems prudent to mitigate their personal survival risk. The calculation results are preferably fully printable, allowing the potential participant to review the information, which aids in the decision making process.

After reviewing the information, the participant can also elect to make a series of purchases of lifetime income shares through the regular investment of plan contributions. A participant or annuitant can elect to purchase lifetime income shares via on-going contributions to his employer's 401(k) plan or via automatic deductions from his paycheck. Alternatively, the participant or annuitant can directly transfer a lump sum from an existing 401(k) plan account. One of ordinary skill in the art will readily appreciate that other purchasing methods may be utilized without departing from the spirit of the present invention.

The following tables illustrate the hypothetical effects of various purchases of lifetime income shares at various ages:

2 highlights the fact that the price per share differs according to each purchaser's age, the amount of income per share is standardized (i.e., $10/month), and that the total amount of income received is a function of a purchaser's life. Table 2 also illustrates the increased income received from purchasing shares in a lump sum.

After the participant elects to purchase one or more lifetime income shares, the provider, benefits provider, or offeror of the shares preferably coordinates the purchase and maintains records of the transaction. For example, information pertaining to the participant's name, ID, employment status, address, contribution amount, and vested amount is preferably recorded and shared among the relevant parties. This

TABLE 1

INCOME PURCHASED BY PERIODIC CONTRIBUTIONS

| Age Contributions Begin | Average Share Price | Total Contributions (at 100/Month until age 65) | Total Shares Purchased | Monthly Income Retirement | Total Income Received From Age 65 to 85 | Total Income Received From Age 65 to 95 |
|---|---|---|---|---|---|---|
| 20 | $350.65 | $54,000 | 154 | $1,540 | $369,600 | $554,400 |
| 30 | $500.00 | $42,000 | 84 | $840 | $201,6000 | $302,400 |
| 40 | $697.12 | $30,000 | 43 | $430 | $103,200 | $154,800 |
| 50 | $1,000.00 | $18,000 | 18 | $180 | $43,200 | $64,800 |

This table highlights several important features of the Lifetime Income Shares. For example, in accordance with the preferred embodiment, the price per share differs according to each purchaser's age. Further, the amount of income per share is standardized (i.e., $10/month). As shown in the last two columns of Table 1, the total amount of lifetime income received is largely a function of the participant or annuitant's actual lifespan.

The actual share price, and thereby the total shares purchased, will vary with the participant or annuitant's age at purchase and a prevailing interest rate at time of purchase, with more shares being purchased when rates are high and fewer when rates are lower. This implicit "dollar-cost averaging" generally allows the participant or annuitant to purchase their guaranteed retirement income in a highly cost-effective basis.

allows all of the parties involved to maintain up to the minute accurate reports relating to the lifetime income shares investment.

Lifetime income shares may allow the participant or annuitant to put some portion or all of his or her other shares back to the insurer. In the preferred embodiment, the participant or annuitant may surrender shares to the insurer, subject to an anti-selection bid asked spread. For example, a typical "put" price would be 96% of the "ask" price for the same "cost" of share being put. Again, the insurer offering the shares coordinates the withdrawal and maintains records of the transaction.

When a participant terminates employment after purchasing lifetime income shares as part of demand contribution a plan, such as a 401 (k) plan, he or she has the option to either (i) cash out the lifetime income shares through a "put" trans-

TABLE 2

INCOME PURCHASED BY TRANSFER

| Age Contributions | Share Price | Transfer Amount | Total Shares Purchased | Monthly Income | Total Income Received | Total Income Received |
|---|---|---|---|---|---|---|
| 30 | $231.79 | $100,000 | 432 | $4,320 | $1,036,80 | $1,550,200 |
| 40 | $393.19 | $100,000 | 254 | $2,540 | $609,600 | $914,400 |
| 50 | $679.12 | $100,000 | 147 | $1,470 | $352,800 | $529,200 |
| 60 | $1,190.00 | $100,000 | 84 | $840 | $201,600 | $302,400 |

Similar to Table 1, Table 2 highlights several important features of the Lifetime Income Shares. As in Table 1, Table action, as described above; or (ii) take a certificate for future guaranteed income represented by the shares.

Importantly, once a lifetime income share is purchased, it is fully portable. With the possible exception of certain de minimus accommodations (e.g., less than five shares purchased, defined contribution plan vesting rules, etc.). There are no circumstances under which the income promised by the lifetime income shares will not be paid, excepting only the participant or annuitant's exercise of any redemption or "put" rights he or she may have, if any.

Lifetime income shares are preferably made available in an IRA form and the certificate distributed by an employers plan is in, or convertible to, an IRA format. In the IRA format, lifetime income shares can be purchased directly by the individual (subject to IRA contribution limits). The present invention also accepts unlimited additional purchases, or as transfers of, other tax-qualified funds.

Lifetime income shares are also available in the form of a non-qualified annuity with the ability to accept both flexible and model premiums.

Figure 9:
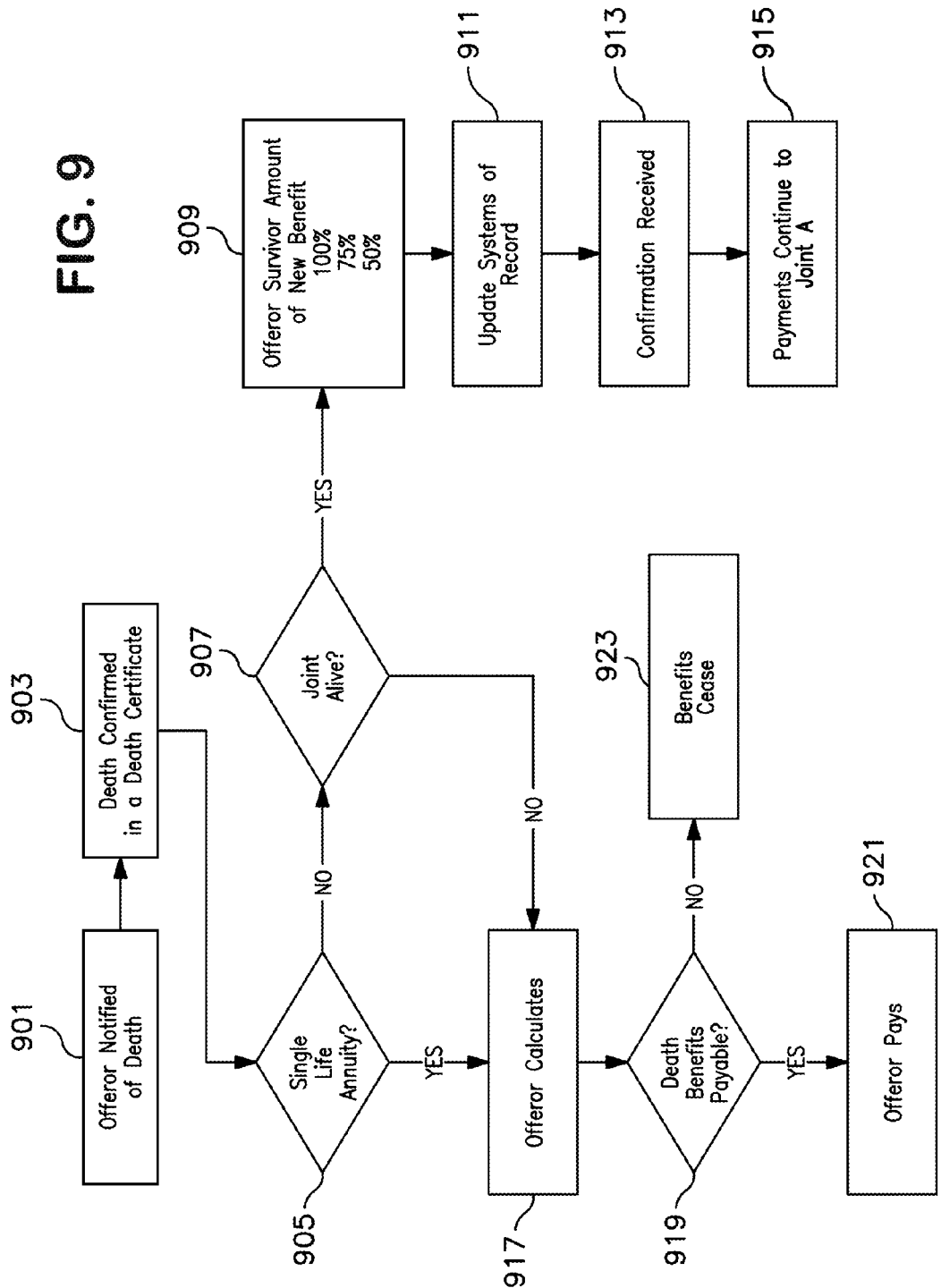
FIG. 9 is a flow chart depicting the process of determining the death benefit of a holder of a lifetime income share purchased using the model in accordance with the preferred embodiment of the present invention.

In addition, lifetime income shares can have a death benefit payout after lifetime income payments have commenced as depicted in FIG. 9. This benefit may be utilized with any of the described models. An alternative death benefit may allow beneficiaries of the participant/annuitant to convert the original shares into a different class of shares on the beneficiaries' life that reflect the age of the beneficiary. These death benefit shares may have different liquidity, redemption, and other features from those originally purchased.

Prior to income commencement, the death benefit will equal total contributions (premium) received, less any redemption amounts (surrenders) paid, if applicable. After the offeror is informed of the purchaser's death 901, the offeror determines whether the lifetime income share was purchased as a single life annuity or a joint life annuity as depicted by 905. In this example, the offeror is notified of death 901 via death certificate 903. However, it is contemplated that other forms of death confirmation can be utilized in accordance with the present invention. A joint annuitant is a person in addition to the annuitant on whose continuation of life annuity payments may be made.

If the lifetime income share comprises a joint annuitant feature, the offeror determines whether the joint annuitant is alive as depicted in 907. If the annuitant is alive, the offeror determines the new death benefit amount 909.

In the preferred embodiment of the present invention, the death benefit is a predetermined percentage of the original lifetime income benefit. As depicted in FIG. 9, the annuitant can select either 50%, 75%, or 100% of the original benefit. However, one of ordinary skill in the art will readily appreciate that any percentage can be chosen, either at the time the lifetime income share is purchased or at the time of the initiation of periodic benefit payments.

The offeror then updates the system records to reflect any new payments 911 and coordinates the confirmation of any new payment to the relevant parties 913. Payments then continue throughout the life of the joint survivor as depicted in 915.

If the participant is a single annuitant or after the joint annuitant is deceased, the offeror calculates the relevant death benefits, if any as depicted in 917. In the preferred embodiment of the present invention, the death benefit will preferably be the greater of zero or total contributions (premium) received less any redemption amounts (surrenders) paid, if applicable, less all income payments made prior to the death of the participant and, if applicable, the joint annuitant. If death benefits are payable, the offeror pays any benefit to the selected beneficiary 921. If no benefit payment is due, benefits cease 923.

Figure 10:
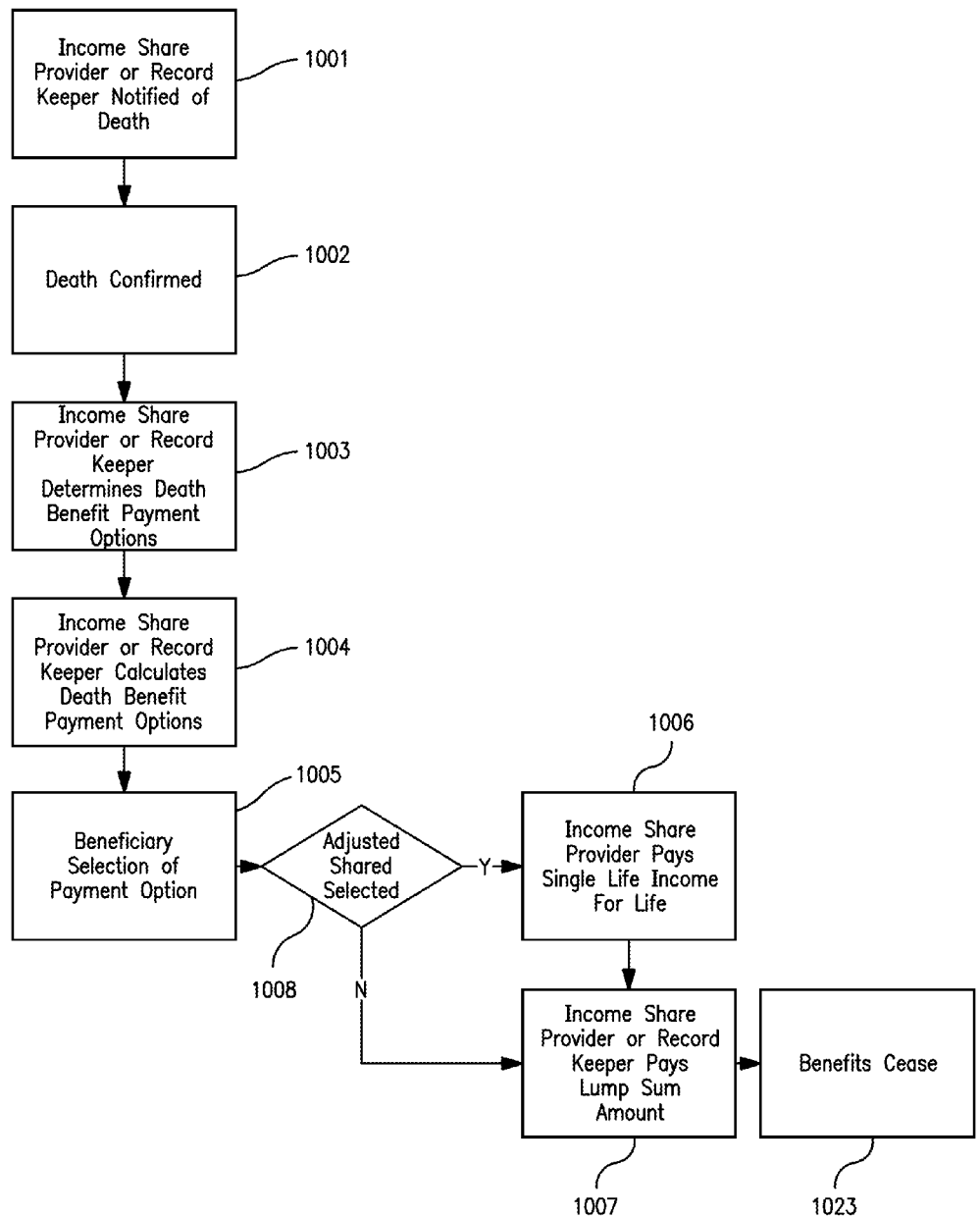
FIG. 10 is a flow chart depicting the process of determining the pre-income death benefit of a holder of a lifetime income share purchased using the model in accordance with the preferred embodiment of the present invention.

In addition, lifetime income shares can have a pre income death benefit. The death benefit payout depicted in FIG. 10 assumes that alternative death benefits are available, the selection of options to be made by the beneficiary, in this case. This death benefit structure may be utilized with any of the described models. The alternatives, typically, would be either a lump sum or an "annuity" death benefit. The alternative "annuity" death benefit may, for example, allow beneficiaries of the participant or annuitant to directly convert the full actuarial value of the original shares into a different class of shares on the beneficiary's life. The converted shares would reflect the age or the age and sex of the beneficiary. These death benefit shares may have liquidity, redemption, and other features that differ from those features in the originally purchased income shares. The lump sum death benefit typically would equal total contributions (premium) received, less any redemption amounts (surrenders) paid, if applicable. In this example, the income share provider is notified of death 1001 via death certificate 1002. After the income share provider is informed of the purchaser's death 1001, the income share provider determines the death benefit payment options as depicted by 1003. However, it is contemplated that other forms of death confirmation can be utilized in accordance with the present invention.

In 1005, the beneficiary selects either a lump sum option or the adjusted shares option. If adjusted shares are selected in 1008, then in 1006, the income share provider pays single life income for life. If adjusted shares are not selected in 1008, then in 1007, the income share provider pays a lump sum amount. After the lump sum payment is made or if no benefit payment is due, benefits cease 1023.

Recordkeeper Calculate Model

Under the recordkeeper calculate model, in which the provider acts as the primary records keeper/coordinator (i.e., similar to a plan administrator recordkeeping for mutual fund investments), a participant is provided with the opportunity to purchase a lifetime income share as part of a portfolio of options in a 401 (k). For example, the participant's employer can introduce a retirement plan with this feature. Alternatively, the benefits provider of an existing retirement plan can add this feature to an existing plan. It is contemplated that any other provider or entity can provide information related to lifetime income shares. Information sources include, but are not limited to, the Internet, direct advertising brochures, other marketing materials, or any other means of making information available to a potential participant.

As with the insurer calculate model, in the recordkeeper calculate model, a participant can access information related to a lifetime income share via an online platform. Similar access to and functionality of the online platform is provided for both models.

After reviewing the information, the participant can preferably elect to purchase one or more lifetime income shares, including fractional shares. For example, to purchase a share utilizing the recordkeeper calculate transaction model, a participant can elect to purchase lifetime income shares via an automatic deduction from her paycheck.

Alternatively, the participant can directly transfer a lump sum from an existing account. It is contemplated that any method of purchase can be utilized in accordance with the present invention.

After the participant elects to purchase one or more lifetime income shares, the income share provider coordinates the purchase and maintains records of the transaction. For example, information pertaining to the participant's name, ID, employment status, address, contribution amount, and vested amount is recorded and shared among the relevant parties. This allows all of the parties involved to maintain accurate reports on a daily basis relating to the lifetime income shares investment.

A lifetime income share allows the participant to withdraw some portion of its value. In the preferred embodiment, the participant withdrawals funds subject to a 96% bid/asked spread (which could also be structure as "redemption charge" of, for example, 4%). Again, the provider coordinates the withdrawal and maintains records of the transaction.

As with the insurer calculate model, when a participant terminates employment after purchasing one or more lifetime income shares as part of a 401 (k) plan, he or she has the option to either (i) cash out the lifetime income shares; or (ii) take a certificate for future guaranteed income. If a participant is fully vested, he or she receives the full value of the lifetime income shares. However, if the participant is only partly vested, he or she receives a pro-rated portion of the cashed out value or the future guaranteed income. In other words, the amount available to a participant is reduced by the percentage that he or she is vested. For example, if a participant is 50% vested, he or she will receive half of the cash out value or half of the future income payment. As with the previous steps of the process, the provider, benefits provider, or offeror of the shares coordinates the withdrawal and maintains records of the transaction.

Lifetime income shares under the recordkeeper calculate transaction model also can have an identical death benefit payout as depicted in FIG. 9.

Management of Lifetime Income Shares Trading

The transactions described above and reflected in FIG. 9 are preferably accomplished using data transfer protocols via unique automated data feeds that automatically update the books and records of both the plan administrator (or relevant financial institution) and the lifetime income share provider. The efficiency of these trading management tools is enhanced by adapting existing, available trading technology tools.

Primarily in conjunction with the recordkeeper calculate model, the present invention contemplates that the trading activity in lifetime income shares is conducted over the trading platforms currently maintained by the National Securities Clearing Corporation ("NSCC"). If appropriate, trades may be made through other comparable alternative or successor trading platforms.

Trading also uses a unique CUSIP-like number, or similar generic identifier to identify the age-based share price (premium) for each distinct annual age cohort. When calendar year pricing is used, a new CUSIP-like number is assigned at the start of each year for the youngest cohort, with the pre-existing cohorts continuing to use the same CUSIP-like number that had been previously assigned. When "attained age" or other methodology is used, individuals would be "reassigned" to a new CUSIP-like number (i.e., cohort) as they advance in age.

The principal advantage of a lifetime income share is that it can be used to mitigate survival risk, or the risk that an individual will outlive his or her assets.

Figure 11:
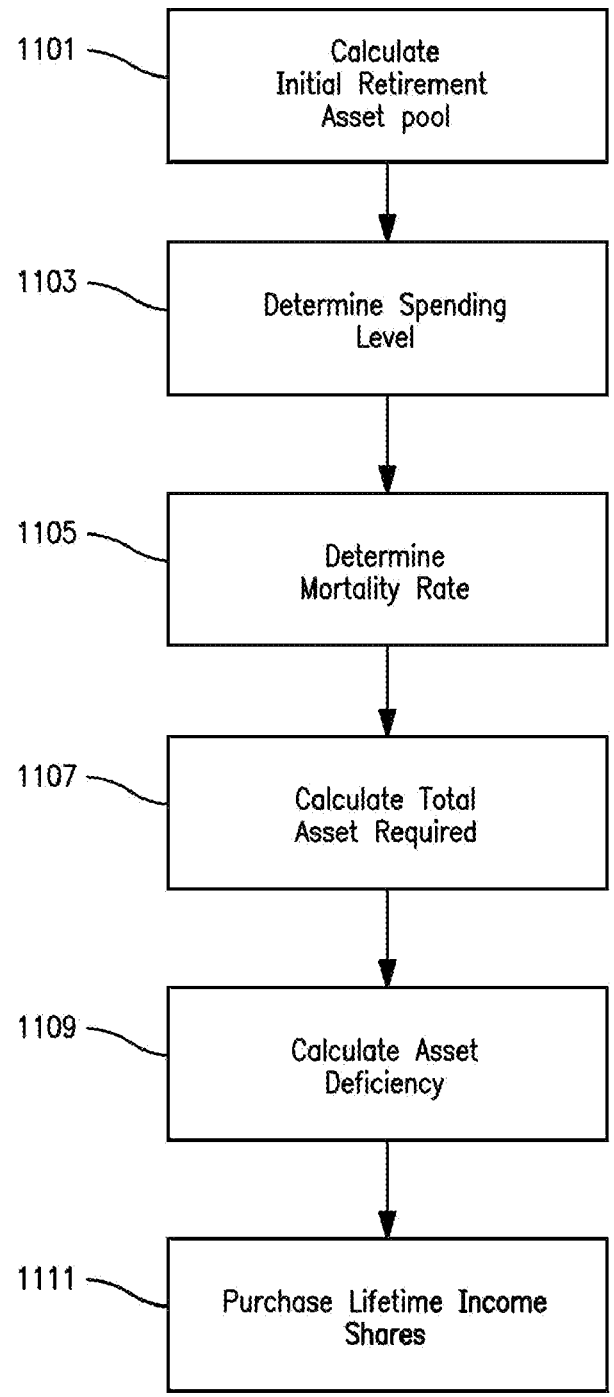
FIG. 11 is a flow chart depicting the sequence of steps of the method for mitigating survival risk in accordance with the preferred embodiment of the present invention.

Referring next to FIG. 11, depicted is as one method of mitigating survival risk utilizing a lifetime income share in accordance with the present invention. Initially, an individual's likely initial retirement asset pool is calculated 1101. This can be done in any well known manner. For example, the asset pool calculation can be accomplished by determining the individual's feasible retirement income level, and calculating the average monthly income available for his or her lifetime after retirement, as well as any deficiency associated therewith. To compensate for any deficiency or to increase his or her monthly income level, and to ensure that the individual does not outlive his or her accumulated liquid assets, it is contemplated that the individual may utilize existing accumulated assets to generate a guaranteed stream of monthly income at a later date. This, in turn, may be utilized to supplement an existing income level or provide income in the event that the individual outlives his or her accumulated liquid assets.

After determining a likely initial retirement asset pool, an individual's periodic spending level 1103 is determined. Typically, this is accomplished by determining an appropriate drawdown rate, which corresponds to the individual's lifestyle. The drawdown rate is utilized to determine an applicable rate of asset depletion based on the same.

Next, an individual's life expectancy is determined 1105. This can be accomplished in any well known way, such as through the use of actuarial mortality tables.

Using the drawdown amount and the life expectancy of an individual, it is possible to calculate the total assets required 1107 for the rest of an individual's life. For example, if an individual is expected to live twenty years, and spends ten thousand dollars a year ($10,000), then the individual needs approximately two hundred thousand dollars ($200,000) for the remainder of his or her life.

After calculating the assets required over the course of an individual's life, the asset deficiency 1109 is calculated by subtracting the initial asset pool from the needed asset amount. If there is a deficiency, there is a risk that the individual will outlive his or her assets. To mitigate this risk, the individual purchases lifetime income shares 1111 in accordance with the present invention. By purchasing the share(s), the purchaser ensures that he or she will receive a monthly payment to supplement his or her asset pool. Because the payments are guaranteed for the purchaser's life, the purchaser cannot outlive his or her assets, even if the initial retirement asset pool is totally depleted.

The following examples highlight some of the benefits of the present invention.

Example #1

A male age 50 is contemplating retirement. Between Social Security and a small pension, he already has $2,000 of monthly income. Assume that he also has $500,000 in liquid investments. Also assume that he needs a minimum of $3,500 in monthly income, but would prefer to have $4,500 or $5,000 of monthly income. If he draws down on his investments at the rate of 4% per year, a conservative rate, he can just make his $3,500 minimum. If he draws down on his investments at an 8% rate, he can reach his $5,000 goal. However, at that rate survival risk is very high.

Next, assume that the individual spends $100,000 to buy 147 lifetime income shares that will pay him $1,470 per month once he reaches 65. The individual can then draw down on his remaining $400,000 of investments at the normal 4% rate with the confidence that he will never run out of income. In addition, the supplemental income of the lifetime income shares assures the purchaser of an income very close to his $5,000 a month goal.

Example #2

A female age 30 has learned that her company's defined benefit pension plan has been frozen and that she will accrue no further benefits under the plan. She elects to contribute $200 per month to lifetime income, to provide herself with lifetime income in retirement. She uses the illustration tool to project that this will generate extra income in retirement of roughly $1,700 per month, assuming that she continues to contribute at that rate.

When she factors in her anticipated rate of salary increase, the projected income at age 65 increases to over $2,700 per month. When combined with Social Security, she concludes that her lifetime income shares will serve to replace the income her employer's defined benefit plan would have provided.

Example #3

A male age 50 contributes $10,000 to lifetime income at age 50, at a price per share of $679.12, purchasing $10,000/$679.12=14.72 shares. He then dies at age 55, and his wife is 56 at the time of his death.

The death benefit payable to the wife is a choice between a cash death benefit and shares of lifetime income. The cash death benefit is a return of net contributions, or $10,000. Alternatively, she can elect to receive a converted number of shares equal to 14.72 shares×(price per share age 55/price per share age 56)=14.72×($899.14/$950.85)=13.92 shares. So the wife can elect to receive either $10,000 or 13.92 shares of lifetime income. These shares will provider her with $139.20 of monthly lifetime income when she reaches age 65 in just nine years.

Example #4

A male makes the following contributions: $10,000 at age 55, $80,000 at age 56, and $50,000 at age 57. He then annuitizes on his $67^{th}$ birthday, with the payout in the form of a 75% Joint & Survivor Cash Refund annuity with his spouse who is age 63 at the time of annuitization.

Total number of shares purchased is $10,000/(price per share at age 55)+$80,000/(price per share at age 56)+$50,000/(price per share at age 57)=$10,000/$899.14+$80,000/$950.85+$50,000/$1005.58=11.1 shares+84.1 shares+49.7 shares=144.9 shares.

The 75% Joint & Survivor with cash refund monthly annuity amount starting at age 67 is equal to the number of shares owned times $10 per share times 1.1334 (the late retirement factor for age 67) times 0.9159 (the 75% Joint and survivor factor for a participant age 67 and a spouse age 63)=144.9×$10×1.1334×0.9159=$1504.20.

While the present invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

What is claimed is:

1. A computer system for administering an income share plan for providing a future income stream, said system comprising:

a processor coupled to a memory, configured to store in the memory, lifetime income share units of guaranteed lifetime income for an individual, each of the units representing an obligation to pay the individual a fixed amount at fixed intervals commencing at a fixed income start date corresponding to a fixed future age of the individual and continuing for a lifetime, the memory further storing the fixed amount, the intervals, and the fixed income start date;

the processor further being configured to store in the memory and provide to the individual a price for said lifetime income share units of guaranteed lifetime income, set by a provider of said plan; and the processor further being configured to store periodic or aperiodic contributions by an individual to said plan, said contributions purchasing whole, fractions or multiples of said lifetime income share units of guaranteed lifetime income at said price; the fixed amount being set at the time of the contributions;

wherein the fixed amount is a precise and invariable amount set at the time of the contributions.

2. The system of claim 1 wherein said plan is an annuity.

3. The system of claim 1 wherein said individual is an annuitant.

4. The system of claim 1 wherein said lifetime is the lifetime of the purchaser or the lifetime of another individual.

5. The system of claim 1 wherein said guaranteed lifetime income is paid monthly.

6. The system of claim 1 wherein said guaranteed lifetime income is paid quarterly.

7. The system of claim 1 wherein said guaranteed lifetime income is paid semi-annually.

8. The system of claim 1 wherein said guaranteed lifetime income is paid annually.

9. The system of claim 1 wherein said income share plan is accessed through an individual's contract with the provider.

10. The system of claim 1 wherein said income share plan is accessed through an individual's taxable account, tax-deferred account, savings account, or investment account.

11. The system of claim 1 wherein said income share plan is accessed through a group program selected from the group consisting of an employer's qualified defined contribution benefit program, a qualified defined benefit program, a qualified cash balance benefit program, non-qualified executive compensation program, or any similar qualified or non-qualified employer benefit program.

12. The system of claim 1 wherein said purchased lifetime income share units of guaranteed lifetime income may be transferred from a first type of plan or account to a second type of plan or account.

13. The system of claim 1 wherein said purchased lifetime income share units of guaranteed lifetime income may be transferred among available investments within any type of plan or account selected from the group consisting of an individual's contract plan with the provider, an individual's taxable account, an individual's tax-deferred account, an individual's savings' account, an individual's investment account, a group employer's qualified defined contribution benefit program, a group qualified defined benefit program, a group qualified cash balance benefit program, a group non-qualified executive compensation program, or any similar qualified or non-qualified employer benefit program.

14. The system of claim 1 wherein said purchased lifetime income share units of guaranteed lifetime income are accounted for as units of future value, which may or may not be converted into future income.

15. The system of claim 1 wherein said purchased lifetime income share units of guaranteed lifetime income are accounted for as units of future amounts of guaranteed income.

16. The system of claim 1 wherein said periodic or aperiodic contributions are made as said individual's choice as part of an individual's personal investment or savings plan or program.

17. The system of claim 16 wherein said investment plan is at the choice of said individual's or said individual's employer as part of the employer's defined contribution savings program.

18. The system of claim 16 wherein said investment plan is a component of the pension or retirement plan or program of the employer.

19. The system of claim 1 wherein said price for said lifetime income share units of guaranteed lifetime income is set based on said individual's age.

20. The system of claim 1 wherein said price for said lifetime income share units of guaranteed lifetime income is set based on said individual's age and gender.

21. The system of claim 19 wherein said price for said lifetime income share units of guaranteed lifetime income is set based on said individual's age at the time of said periodic or aperiodic contributions.

22. The system of claim 20 wherein said price for said lifetime income share units of guaranteed lifetime income is set based on said individual's age and gender at the time of said periodic or aperiodic contributions.

23. The system of claim 19 wherein said price for said lifetime income share units of guaranteed lifetime income is set based on said individual's age at the time of said income start date.

24. The system of claim 20 wherein said price for said-lifetime income share units of guaranteed lifetime income is set based on said individual's age and gender at the time of said income start date.

25. The system of claim 19 wherein said price for said lifetime income share units of guaranteed lifetime income is the same for any individual under a specified age at the time of said periodic or aperiodic contributions.

26. The system of claim 20 wherein said price for said lifetime income share units of guaranteed lifetime income is the same for any individual under a specified age and gender at the time of said periodic or aperiodic contributions.

27. The system of claim 19 further comprising CUSIP-like numbers to identify specific age based prices.

28. The system of claim 20 further comprising CUSIP-like numbers to identify specific age and gender based prices.

29. The system of claim 1 further comprising a surrender value for said lifetime income share units of said guaranteed lifetime income.

30. The system of claim 29 and further comprising a bid/asked surrender value.

31. The system of claim 1 further comprising an illustration tool, said illustration tool projecting the amount of contributions or the amount of guaranteed lifetime income based on current premium rates.

32. A method for mitigating survival risk for an income share plan that provides a future income stream, said method comprising the steps of:
 setting, by a computer, a price for lifetime income share units of guaranteed lifetime income for an individual, each of the units representing an obligation to pay the individual a fixed amount at fixed intervals commencing at a fixed income start date corresponding to a fixed future age of the individual and continuing for a lifetime, set by a provider of a plan and storing in a computer system memory the price, the amount, the intervals, and the income start date;
 storing by the computer in the memory data indicative of sales in consideration for periodic or aperiodic contributions by the individual, whole, fractions or multiples of the lifetime income share units of guaranteed lifetime income at the price;
 setting by the computer the fixed amount at the time of the contributions; and
 providing by the computer data indicative of instructions to pay the guaranteed lifetime income in the fixed amount to the individual starting on the income start date;
 wherein the fixed amount is a precise and invariable amount set at the time of the contributions.

33. The method of claim 32 wherein the plan is an annuity.

34. The method of claim 32 wherein the individual is an annuitant.

35. The method of claim 32 wherein the lifetime is the lifetime of the purchaser or the lifetime of another individual.

36. The method of claim 32 wherein the guaranteed lifetime income is paid periodically.

37. The method of claim 32 wherein the guaranteed lifetime income is paid aperiodically.

38. The method of claim 32 further comprising the step of paying the guaranteed lifetime income monthly.

39. The method of claim 32 further comprising the step of paying the guaranteed lifetime income quarterly.

40. The method of claim 32 further comprising the step of paying the guaranteed lifetime income semi-annually.

41. The method of claim 32 further comprising the step of paying the guaranteed lifetime income annually.

42. The method of claim 32 further comprising the step of accessing the income share plan though an individual's contract with the provider.

43. The method of claim 32 further comprising the step of accessing the income share plan though an taxable account, tax-deferred account, savings account, or investment account.

44. The method of claim 32 further comprising the step of accessing the income share plan though a group program selected from the group consisting of an employer's qualified defined contribution benefit program, a qualified defined benefit program, a qualified cash balance benefit program, non-qualified executive compensation program, or any similar qualified or non-qualified employer benefit program.

45. The method of claim 32 wherein the income start date is an anticipated retirement date of the individual.

46. The method of claim 32 further comprising the step of transferring the purchased lifetime income share units of guaranteed lifetime income from a first type of plan or account to a second type of plan or account.

47. The method of claim 32 comprising the step of transferring the purchased lifetime income share units of guaranteed lifetime income among available investments within any type of plan or account selected from the group consisting of an individual's contract plan with the provider, an individual's taxable account, an tax-deferred account, an individual's savings account, an investment account, a group employer's qualified defined contribution benefit program, a group qualified defined benefit program, a group qualified cash balance benefit program, a group non-qualified executive compensation program, or any similar qualified or non-qualified employer benefit program.

48. The method of claim 32 further comprising the step of accounting for the purchased lifetime income share units of guaranteed lifetime income as units of future value, which may or may not be converted into future income.

49. The method of claim 32 further comprising the step of accounting for the purchased lifetime income share units of guaranteed lifetime income as units of future amounts of guaranteed income.

50. The method of claim 32 further comprising the step of making the periodic or aperiodic contributions as the individual's choice as part of an individual's personal investment or savings plan or program.

51. The method of claim 50 wherein the investment plan is at the choice of the individual's or the individual's employer as part of the employer's defined contribution savings program.

52. The method of claim 50 wherein the investment plan is a component of the said individual's pension or retirement plan or program of the individual's employer.

53. The method of claim 32 further comprising the step of setting the price for the lifetime income share units of guaranteed lifetime income based on the individual's age.

54. The method of claim 32 further comprising the step of setting the price for the lifetime income share units of guaranteed lifetime income based on the individual's age and gender.

55. The method of claim 53 further comprising the step of setting the price for the lifetime income share units of guaranteed lifetime income based on the individual's age at the time of the periodic or aperiodic contributions.

56. The method of claim 54 further comprising the step of setting the price for the lifetime income share units of guaranteed lifetime income based on the individual's age and gender at the time of the periodic or aperiodic contributions.

57. The method of claim 53 further comprising the step of setting the price for the lifetime income share units of guaranteed lifetime income based on the individual's age at the time of the income start date.

58. The method of claim 54 further comprising the step of setting the price for the lifetime income share units of guaranteed lifetime income based on the individual's age and gender at the time of the income start date.

59. The method of claim 53 wherein the price for the lifetime income share units of guaranteed lifetime income is the same for any individual under a specified age at the time of the periodic or aperiodic contributions.

60. The method of claim 54 wherein said price for said lifetime income share units of guaranteed lifetime income is the same for any individual under a specified age and gender at the time of said periodic or aperiodic contributions.

61. The method of claim 53 wherein the step of setting a price further comprises the step of identifying specific age based prices using CUSIP-like numbers.

62. The method of claim 54 wherein the step of setting a price further comprises the step of identifying specific age and gender based prices using CUSIP-like numbers.

63. The method of claim 32 further comprising the step of determining the surrender value of the guaranteed lifetime income.

64. The method of claim 63 wherein the step of determining the surrender value is performed using the reverse purchase methodology.

65. The method of claim 63 wherein the step of determining the surrender value is performed using the bid/asked methodology.

66. The method of claim 32 further comprising the step of projecting the amount of periodic or aperiodic contributions an individual would need to make to reach a specific goal of guaranteed lifetime income using an illustration tool.

67. The method of claim 32 further comprising the step of projecting the amount of guaranteed lifetime income an individual would receive based on specific periodic or aperiodic contributions using an illustration tool.

68. The method of claim 66 further comprising the step of adjusting for assumptions selected from the group consisting of early retirement date, late retirement date, different annuity form election or different salary increase assumptions.

69. The method of claim 68 further comprising the step of adjusting for assumptions selected from the group consisting of early retirement date, late retirement date, different annuity form election, or different salary increase assumptions.

70. The method of claim 67 wherein the step of projecting further comprises using current premium rates.

71. The method of claim 69 wherein the step of purchasing further comprises using the illustration tool to determine exactly the number of lifetime income share units of guaranteed lifetime income that may be immediately purchased.

72. A computer system for mitigating survival risk in an income share plan that provides a future income stream, said system comprising:
   a processor configured to set a price for lifetime income share units of guaranteed lifetime income for an individual as determined by a provider of the plan, each of the units representing an obligation to pay the individual a fixed amount at fixed intervals commencing at a fixed income start date corresponding to a future fixed age of the individual and continuing for a lifetime, the processor setting the fixed amount, the intervals, and the income start date;
   memory coupled to the processor configured to store purchases, through periodic contributions by an individual, whole, fractions or multiples of the discrete units of guaranteed lifetime income at the price;
   wherein the processor is configured to initiate payments of the guaranteed lifetime income to the individual starting on the fixed income start date, the fixed amount being set at the time of the contributions;
   wherein the fixed amount is a precise and invariable amount set at the time of the contributions.

73. The method of claim 66 wherein the step of projecting further comprises using current premium rates.

* * * * *